Patented Dec. 15, 1931

1,836,255

UNITED STATES PATENT OFFICE

JAMES KEETH, OF SPOKANE, WASHINGTON

DUST PREVENTIVE FOR ROADS

No Drawing.  Application filed December 27, 1927.  Serial No. 242,969.

The object of this invention is to provide an improved dust preventive for roads.

One of the features of this invention is to provide a dust preventive that includes, as an ingredient, a moisture or water storage or retaining material having a high coefficient of absorption.

It is a feature of my invention to make this material a main body of the preventive, or in other words, to employ this ingredient as one preponderant of the aggregate mass.

It is also a feature of my invention to employ a preponderant mass or body material which has a high coefficient of heat-resistance, or in other words, a very low degree of heat conductivity, so that this main body material will function to arrest capillary attraction of the moisture from the road by the sun, its function in this respect being enhanced by being associated with the remaining ingredient in the relation of a preponderant body.

The invention resides in adding to this main body material, a water or moisture feeding substance of a character that will attract moisture from the air so that the preponderant body ingredient will be substantially continuously fed and charged with water to render the novel preventive effective.

In order further to define and characterize the invention, it is informative to state that my novel preventive is not of a permanent structural nature and is not physically and structurally incorporated in the road body to which it is applied, but it is, on the contrary, a type of semi-permanent preventive.

Having generally outlined the main objects and broad features of my invention, I will next more specifically state its nature and composition, in some of the most improved forms.

The base or body material is preferably formed of one of the vermiculite family and is sometimes specifically termed jefferisite, although deposits of suitable material of this character have been discovered in Montana which is known as an altered biotite, and which has been placed on the market under the trade name of "Zonolite", and which is suitable for my use.

I will further define the character of the material by stating that when dehydrated or desiccated, as it must be, it is of greatly expanded bulk compared to its bulk when mined, in fact so much so that it is aeriferous. It has a very high coefficient of water absorption which it retains for a relatively long period of time even when exposed to the sun's rays. Its laminæ exfoliates and when the material is ground or comminuted, which is substantially essential for this purpose, it takes on a fluffy, flaky apearance, is golden bronze in color and extremely dry. It is also an extremely efficient insulator.

I do not wish, in all embodiments to be limited to the precise elements named, as one having the general characteristics set forth will be sufficient to successfully carry out my invention.

In interdependent coaction with this mass material, I use what I will term, broadly, a moisture or water attracting and expelling material, and in practice, I find that this function is best and most practically performed by calcium chloride. I use this in its commercial form, which may be either granular or flaky.

In practice, both ingredients are of a suitable fineness to readily pour, in order to facilitate distribution over the road surface and I have found that good results may be obtained by mixing these two ingredients dry. The preferred proportions by weight are about seven pounds of fine jefferisite to five pounds of fine calcium chloride, although under some conditions, I may even reduce the proportion of the latter to three pounds. Because of the great difference in mass volume between these two ingredients, this preferred proportion would make the main body material preponderant in mass to the extent of at least seven to one, as regards this first named proportion. In any event, the main body ingredient will always exceed in volume, the calcium chloride.

In applying my improved preventive mixture to a road surface, it is distributed or poured in accordance with present practice, but the distinction remains that my material is poured thickly over the road.

In some instances, I employ a depth of three quarters of an inch, although varying conditions may require a greater or less thickness, but in any event, it is highly desirable to continuously blanket that portion of the road to be treated. After the material becomes wet, and under a rolling pressure, the covering is not only reduced or compressed to about an eight or a quarter of an inch in thickness, but this previously dry comminuted material becomes a plastic mass. Because of this fact, the particles of the moisture retaining material, which is rendered plastic when wet and under pressure, is brought into very intimate contact with the calcium chloride, thereby facilitating transfer of the water from the latter to the former, by reason of such close physical contact.

If the road to be treated can be blocked off from traffic for a day or a night, the preventive can be poured and in twelve hours the calcium will have attracted enough moisture from the air to wet the main body ingredient so that the rolling action of subsequent traffic can be relied upon to compress the preventive. The fact that my preventive is sufficiently non-viscous not to adhere to tires or leather, is a very great advantage.

If traffic cannot be blocked off, the preventive blanket may be sprinkled and pressure rolled by a road roller, to thereby hasten perfection and completion of the treatment.

Now the importance of the insulating feature afforded by my novel preventive should be clear since it is now evident that this thin plastic blanket will effectively arrest the sun's rays from drawing whatever moisture the road may have held. Hence, my preventive functions to conserve what moisture is already in the road, and if the treatment is made early in the spring, the moisture conserving benefits will be materially enhanced.

It will also be clear that there is a very intimate coaction between the two ingredients since the one not only collects, but by being in such close physical contact with the plastic body, the latter is continuously fed with water from the former.

It is now believed that my invention will be fully understood from the foregoing description, and while I have herein described specific forms of my invention, I do not wish to be limited thereto except for such limitations as the claims may import.

I claim:

1. In a dust preventive for roads, a heat treated comminuted body of zonolite, and a ground moisture attracting body intermingled with said zonolite to supply moisture to the latter.

2. In a dust preventive for roads, a heat treated comminuted body of zonolite having a high coefficient of moisture absorption, and a fine moisture attracting and expelling body of calcium chloride mixed with said zonolite.

3. In a dust preventive for roads, a comminuted body of artificially expanded and desiccated zonolite, and a body of ground moisture attracting material mixed with said zonolite.

4. In a dust preventive for roads, a ground body of dehydrated zonolite of greatly expanded bulk and which becomes thin and plastic when wet and rolled, to thereby form a thin road blanket, and a moisture attracting material mixed with said dehydrated zonolite while the latter is dry.

5. In a dust preventive for roads, a fine body of zonolite having a high coefficient of heat insulation, and a fine body of moisture attracting material mixed with said first named material, and said zonolite being greatly preponderant in the aggregate mass and serving to arrest capillary attraction from the road.

In witness whereof, I have hereunto affixed my signature.

JAMES KEETH.